United States Patent
Agoston et al.

(10) Patent No.: US 8,155,165 B2
(45) Date of Patent: Apr. 10, 2012

(54) METHOD OF CHARACTERIZING PARAMETERS AND REMOVING SPECTRAL COMPONENTS OF A SPREAD SPECTRUM CLOCK IN A COMMUNICATIONS SIGNAL

(75) Inventors: Maria Agoston, Beaverton, OR (US); Laszlo J. Dobos, Beaverton, OR (US); Pavel R. Zivny, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 688 days.

(21) Appl. No.: 12/211,009

(22) Filed: Sep. 15, 2008

(65) Prior Publication Data

US 2009/0074030 A1 Mar. 19, 2009

Related U.S. Application Data

(60) Provisional application No. 60/972,381, filed on Sep. 14, 2007.

(51) Int. Cl.
*H04B 1/00* (2006.01)

(52) U.S. Cl. .......................................... 375/130; 375/376

(58) Field of Classification Search .................. 375/130
See application file for complete search history.

(56) References Cited

U.S. PATENT DOCUMENTS

| | | | | |
|---|---|---|---|---|
| 6,697,416 B1 * | 2/2004 | Jennings | ........................ | 375/130 |
| 7,912,109 B1 * | 3/2011 | Li | ............................... | 375/130 |
| 2006/0056562 A1 * | 3/2006 | Chen et al. | .................... | 375/376 |
| 2007/0019711 A1 * | 1/2007 | Mallinson et al. | ............ | 375/130 |
| 2007/0035428 A1 * | 2/2007 | Badaroglu | ..................... | 341/143 |
| 2009/0135885 A1 * | 5/2009 | Lin | ............................... | 375/130 |

OTHER PUBLICATIONS

Kantack, Bryan, "Spread-spectrum clocking: measuring accuracy and depth," EDN, May 11, 2006, pp. 61, 62, 64.

Hsieh, Ming-Ta and Sobelman, Gerald E., "Clock and Data Recovery with Adaptive Loop Gain for Spread Spectrum SerDes Applications," Department of Electrical and Computer Engineering, University of Minnesota, 200 Union Street SE, Minneapolis, MN 55455, 4 pages, Jul. 25, 2005.

\* cited by examiner

*Primary Examiner* — David C. Payne
*Assistant Examiner* — Erin File
(74) *Attorney, Agent, or Firm* — William K. Bucher

(57) ABSTRACT

Parameters of a spread spectrum clock signal in a communication signal are characterized by acquiring voltage samples of the communication signal at a nominal time location of an edge of the communication signal. The voltage samples are converted to time samples and the difference between the maximum and minimum time values is determined at the nominal time location. A spread spectrum clock magnitude number is generated by dividing the difference between the maximum and minimum time values by the nominal time location of the acquired voltage samples of the spread spectrum clock signal. A spread spectrum modulation profile of a spread spectrum clock signal is estimated by over sampling the time samples using an aliased index value to generate over sampled triangular waveforms representing the spread spectrum clock modulation profile. One of the over sampled triangular waveforms is use to generate the spread spectrum clock modulation profile.

3 Claims, 5 Drawing Sheets

METHOD OF CHARACTERIZING PARAMETERS AND REMOVING SPECTRAL COMPONENTS OF A SPREAD SPECTRUM CLOCK IN A COMMUNICATIONS SIGNAL

CROSS REFERENCE TO RELATED APPLICATIONS

This application claims the benefit of the U.S. Provisional Application No. 60/972,381, filed Sep. 14, 2007.

BACKGROUND OF THE INVENTION

Electrical serial communication standards, such as SATA, PCI-Express, FBDIM, HT3, and the like, are using Spread Spectrum Clocking (SSC) to minimize the effects of electromagnetic interference between communication channels. Standards have a specified clock modulation frequency typically in the range of 30 KHz to 33 KHz, and a modulation magnitude range of 0 PPM to −5000 PPM. When analyzing jitter on a serial data pattern, the effects of SSC appear as uncorrelated periodic jitter. As a consequence, Bit Error Rate (BER) estimations made on the basis of jitter breakdown in its components will be skewed by the effects of clock modulation.

A sequential sampling oscilloscope is a primary tool for analyzing and characterizing electrical serial links. Currently, there is no sampling oscilloscope based solution in the market that deals with jitter analysis and BER estimation in the presence of SCC.

SUMMARY OF THE INVENTION

The present invention characterizes parameters of a spread spectrum clock base modulation signal in a communication signal. One parameter of the spread spectrum clock base modulation signal is a spread spectrum clock base modulation signal modulation magnitude. One method of characterizing the spread spectrum clock base modulation signal modulation magnitude has an initial step of acquiring a set of voltage samples of the communication signal having the spread spectrum clock base modulation signal at a nominal time location and converting the set of voltage samples into time samples representing triangular modulation rate profiles for cycles of the spread spectrum clock base modulation signal. The difference between the maximum and minimum values of the timing deviation of the triangular modulation rate profiles of the spread spectrum clock base modulation signal is determined, and a spread spectrum clock base modulation signal magnitude number is generated by dividing the difference between the maximum and minimum values of the timing deviation of the triangular modulation rate profiles by the nominal time location of the acquired voltage samples of the communications signal. The spread spectrum modulation clock magnitude number may be multiplied by a scalar value, such as 1e6, to produce a spread spectrum clock base modulation signal modulation magnitude.

An alternative method for characterizing the modulation magnitude of a spread spectrum clock base modulation signal in a communication signal that results in greater accuracy has an initial step of acquiring a first set of voltage samples of the communication signal having the spread spectrum clock base modulation signal at a first nominal time location and converting the first set of voltage samples into time samples representing triangular modulation rate profiles for cycles of the spread spectrum clock base modulation signal. The difference between the maximum and minimum values of the timing deviation of the triangular modulation rate profile of the spread spectrum clock modulation base signal at the first nominal time location is determined. A second set of voltage samples are acquired of the communication signal having the spread spectrum clock base modulation signal at a second nominal time location greater than the first nominal time location and converted into time samples representing triangular modulation rate profiles for cycles of the spread spectrum clock base modulation signal. The difference between the maximum and minimum values of the timing deviation of the triangular modulation rate profile of the spread spectrum clock base modulation signal at the second nominal time location is determine. A spread spectrum clock base modulation signal magnitude number is generated by subtracting the difference between the maximum and minimum values of the timing deviation of the triangular modulation rate profile at the first nominal value from the difference between the maximum and minimum values of the timing deviation of the triangular modulation rate profile at the second nominal value and by the nominal time location and dividing resultant number by the difference between the second and first nominal time locations of the first and second acquired voltages of the communications signal. The spread spectrum modulation clock base modulation signal magnitude number may be multiplied by a scalar value, such as 1e6, to produce a spread spectrum clock base modulation signal modulation magnitude.

Another parameter of the spread spectrum clock is a spread spectrum clock base modulation signal modulation profile. One method of characterizing the spread spectrum clock base modulation signal modulation profile has an initial step of acquiring a set of voltage samples of the communication signal having the spread spectrum clock base modulation signal at a nominal time location and converting the set of voltage samples into time samples representing triangular modulation rate profiles for cycles of the spread spectrum clock base modulation signal. An integer aliased index value is calculated as a function of a pattern trigger rate divided by the clock rate of the spread spectrum clock signal and added to an initial time sample location to reposition a subsequent time sample location. The integer aliased index value is added to the repositioned time sample location to reposition another subsequent time sample location. The index value added to subsequent repositioned time sample locations for the complete set of time samples to generate over sampled triangular waveforms representing the spread spectrum clock base modulation signal modulation profile. A spread spectrum clock base modulation signal modulation profile is generated from the over sampled triangular waveform starting at the initial time sample location.

The objects, advantages and other novel features of the present invention are apparent from the following detailed description when read in conjunction with the appended claims and attached drawings.

DESCRIPTION OF THE INVENTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a digitizing instrument, using terms such as data, values, voltage samples, numbers and the like, consistent with the manner commonly employed by those skilled in the art to convey the substance of their work to others skilled in the art. As is well understood by those skilled in the art, these quantities take the form of electrical or optical signals capable of being stored, transferred, combined and otherwise manipulated through mechanical and electrical components of the digitizing instrument; and the term digitizing instrument includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

Figure 1:
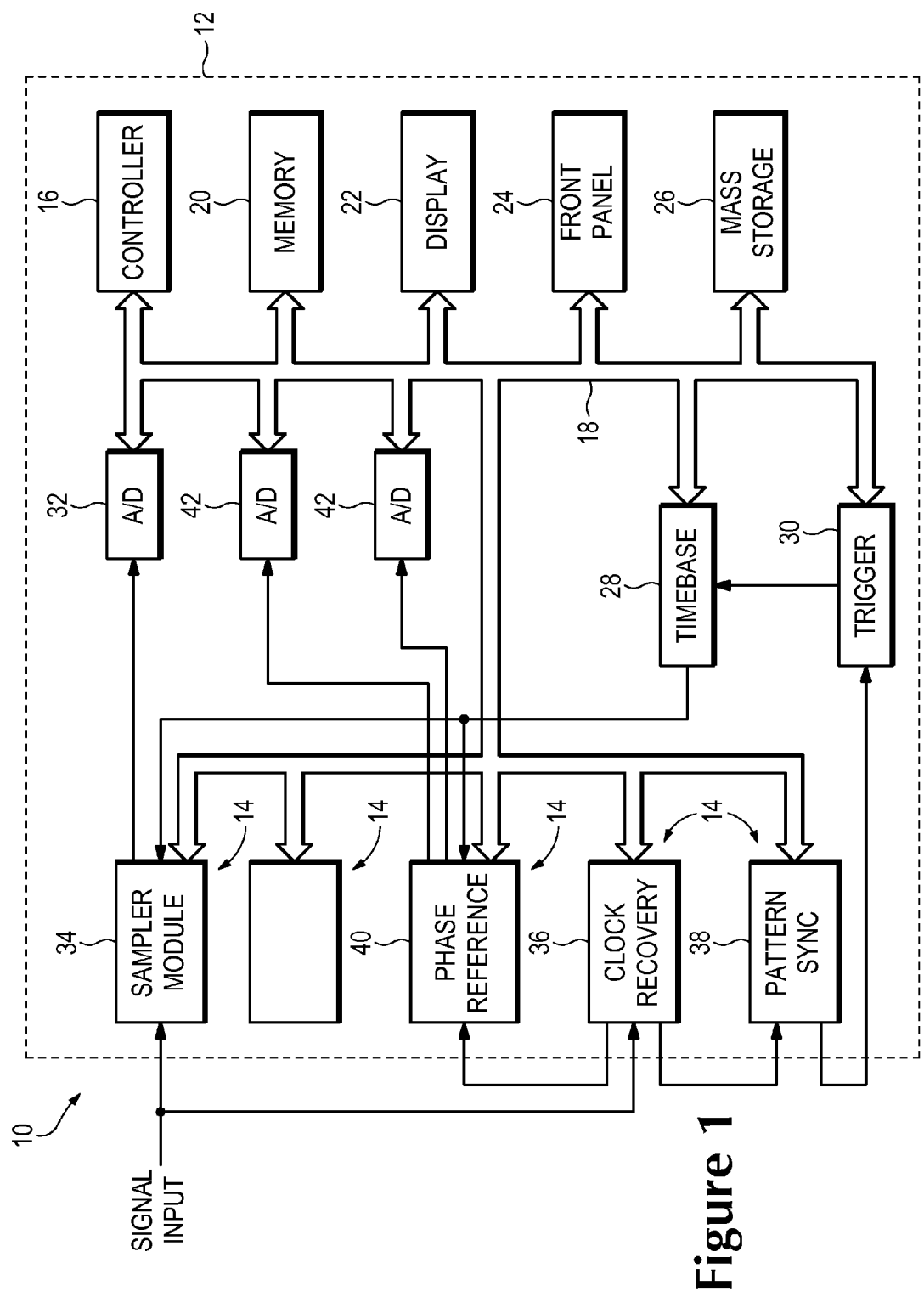
FIG. 1 is a block diagram of a representative digitizing instrument implementing the method of characterizing parameters of a spread spectrum clock base modulation signal in a communication signal and removing spectral components of a spread spectrum clock base modulation signal in a communication signal.

Referring to FIG. 1, there is shown a representative block diagram of a digitizing instrument 10, such as the DSA8200 Digital Sampling Oscilloscope, manufactured and sold by Tektronix, Inc., Beaverton, Oreg., implementing the method of characterizing parameters and removing spectral components of a spread spectrum clock base modulation signal in a communication signal. The DSA8200 Digital Sampling Oscilloscope 10 has a mainframe 12 and a plurality of module bays or slots 14 that receive various plug-in modules designed for the oscilloscope 10. The mainframe 12 has a main controller 16, such as PENTIUM® microprocessor, manufactured and sold by Intel, Corp., Santa Clara, Calif. or other similar processors. The controller 16 is coupled via a system bus 18 to system memory 20 that includes both RAM, ROM and cache memory with the RAM memory storing volatile data, such as the digitized values representative of the communication input signal, timebase calibration values, look-up tables and the like. The system bus 18 is also coupled to a display device 22, such a liquid crystal display, cathode ray tube or the like, and front panel controls 24 with buttons, rotatable knobs and the like and/or control entry devices, such as a keyboard and/or mouse. A mass storage unit or units 26, such as a hard disk drive, a CD ROM drive, a tape drive, a floppy drive or the like, that reads from and/or writes to appropriate mass storage media, may also be connected to the system bus 18. The system bus 18 is also coupled to the module bays 14, a timebase generator 28, and a trigger circuit 30. Program instructions that control the functions of the oscilloscope 10 may be stored and accessed from the ROM memory 20 or from the mass storage media of the mass storage unit 26. The oscilloscope 10 is preferably a PC based system functioning under the overall control of an operating system, such as the WINDOWS® operating system, manufactured and sold by Microsoft, Corp., Redmond, Wash. or other type of operating system. Controller 16 and system bus 18 in the block diagram are representative of multiple controllers and busses used in the oscilloscope 10. A separate controller is used to control the acquisition of digitized samples with DSP controllers processing the signal samples and passing the processed samples to the control processor for display on display device 22.

The DSA8200 Digital Sampling Oscillscope 10 may be configured with a variety of plug-in modules for performing various measurements and analysis. The preferred configuration for characterizing parameters of a spread spectrum clock base modulation signal in a communication signal and removing spectral components of a spread spectrum clock base modulation signal in a communication signal is a Sampling Module 34 for sampling a communication signal having data and a spread spectrum clock signal. Examples of the Sampling Modules are the 80E Series of Electrical Modules and the 80C Series of Optical modules, manufactured and sold by Tektronix, Inc. The incoming communication signal is also provided to a Clock Recovery Module 36, such as the 80A07, manufactured and sold by Tektronix, Inc., for recovering the spread spectrum clock signal from the incoming communication signal. The recovered spread spectrum clock signal is provided to a PatternSync Trigger Module 38, such as the 80A06, manufactured and sold by Tektronix, Inc., for dividing the clock signal for application to the trigger circuitry 30 in the oscilloscope 10. The recovered spread spectrum clock signal is also provided to a Phase Reference Module 40, such as the 82A04, manufactured and sold by Tektronix, Inc., that in conjunction with the timebase provides femtosecond timing accuracy of the acquired samples. The various plug-in modules and module bays 14 have interfaces connectors that provide voltage power from the mainframe 12 to the plug-in as well as providing signal lines for coupling signals into and out of the modules and providing system bus connectivity. While the above description of the digitizing oscilloscope has a mainframe 12 and module bays 14 for receiving various electrical and optical modules, the method described below may equally be performed using a digitizing oscilloscope where the functionality of the above described modules are built into the mainframe.

The method of characterizing parameters and removing spectral components of a spread spectrum clock base modulation signal in a communication signal will now be described using a communication signal having a spread spectrum clock signal mixed with a data pattern. The spread spectrum clock signal has a base modulation signal generally in the range of 30 KHz to 33 KHz that modulates the spread spectrum clock signal. The communication signal may be generated using a spread spectrum clock generator whose output is coupled to a data generator. The data generator mixes the spread spectrum clock signal with a user defined data pattern and outputs the communication signal. The communication signal may also be received from a device under test, such as a circuit component in an electrical serial communication channel or a circuit board implementing circuitry of one of the electrical serial communication standards. The Sampling Module 34 receives the communication signal having the spread spectrum clock signal and carrying the data pattern to be tested and couples the communication signal to sampling diodes within the Sampling Module 34. The communication signal is sampled in response to sampling strobes from the timebase 28. The sampling module 34 may include strobe shaping circuitry that shapes the strobe pulses and generates differential strobe pulses. The outputs of the sampling diodes may be summed and input to an operational amplifier that amplifies the combined sampled communication signal. The amplified output of the operational amplifier is coupled to a buffer amplifier that conditions the samples for input to an A/D converter 32. The A/D converter 32 converts the analog samples into digital values that are coupled via the system bus 18 to the memory 20 for storage and further processing. Alternately, the outputs of the sampling diodes are coupled to operational amplifiers that amplify sampled communication signal. The amplified outputs are summed in a summing circuit and coupled to the buffer amplifier.

The Clock Recovery Module 36 extracts the spread spectrum clock signal from the communication signal and couples the spread spectrum clock signal to the PatternSync Trigger Module 38. The PatternSync Trigger Module 38 has processor controlled dividers that divide the spread spectrum clock signal to produce a pattern trigger output that equal to or less than the maximum sample rate of the oscilloscope. The divider ratio is set based on two criteria: 1) the communication signal is sampled at a nominal time location in the clock and 2) the pattern trigger output is equal to or less than the maximum sample rate of the oscilloscope. The repetition rate is the number of bit patterns that need to be skipped between strobe pulses for sampling to occur at the same location in the pattern within the maximum sample rate of the oscilloscope. For example, for a 1 GB/s communication signal having a bit pattern of 127 requires a repetition of 40 in order for the pattern trigger rate to be within the maximum 200 KHz sample rate. The pattern trigger rate is determined by dividing the bit rate of the communication signal by the pattern length times the repetition rate. The pattern trigger rate in this example is 196.85 KHZ which is within the maximum sampling rate of the oscilloscope. In an example for the spread spectrum clock itself, the spread spectrum clock has a bit pattern of 1 on a 1 GHZ clock signal. The divider ratio is set to 5000 (1e9 divided by 5e3) so that the calculated pattern trigger rate is 200 KHZ which is the maximum sampling rate for the oscilloscope.

The pattern trigger output is coupled to the trigger circuit 30 which generates a trigger signal that is coupled to the timebase 28. The timebase 28 includes circuitry for generating a gated or phase controlled clock signal that is coupled to a strobe generator 28 having counter circuitry and interpolator circuitry. The counter circuitry and interpolator circuitry establishing coarse and fine time delay increment relative to the pattern trigger output. The clock signal is coupled to counter circuitry and to the controller 16 via the system bus 18. The controller 16 loads coarse time delay values into the counter. The counter circuitry counts the clock pulses of the gated or phase controlled clock signal and generates an output when the clock count equals the coarse time delay value. The output from the counter circuitry is coupled to a ramp generator that is part of the interpolator circuitry providing 0-3 ns time delay change. The ramp generator initiates a ramp signal that is coupled to the minus input of a comparator circuit. The plus input to the comparator circuit is an analog signal from a digital-to-analog converter. The D/A converter is a 14 bit device that receives digital-to-analog converter (DAC) code values from a horizontal look-up table stored in memory 20. The horizontal look-up table contains DAC values that correct for non-linearities in the interpolator circuitry. The output of the timebase 28 are strobe pulses provided to the sampling module 34 and the phase reference module.

The Phase Reference Module 40 receives the strobe pulses from the timebase 28 and the spread spectrum clock signal from the Clock Recovery Module 36. The Phase Reference Module 40 splits the strobes pulses along two paths with one path having a ninety degree delay. The spread spectrum clock signal is split into two paths with each path being coupled to sampling diodes. The spread spectrum clock signal is sampled by each set of sampling diodes with one set of sampling diodes being strobed by the non-delayed strobe pulses and the other set of sampling diodes being strobed by the ninety degree delayed strobe pulses. The output of the sampling diodes are combined and amplified in the same manner as the communication signals in the Sampling Module 34. The sampled clock signals of the Phase Reference Module 40 are coupled to respective A/D converters 42 that convert the analog samples into digital values. The digital values of the A/D converters are coupled via the system bus 18 to the memory 20 for storage and further processing. The sampling of the communication signal by the Sampling Module 34 and the sampling of the spread spectrum clock signal using the two set of sampling diodes by the Phase Reference Module 40 occur at the same time using the non-delayed and delayed strobe pulses. A large number of sample triplets (i.e. vertical values of the data, clock and delayed clock) are acquired at random times relative to the data and clock signals. The maximum and minimum of the clock/data sets determine the maximum and minimum of the clock signals. Using this scale factor with the clock signal being a sinusoid, trigonometric relationships may be applied to calculate from the pairs of clock and delayed clock samples a set of phase information that corresponds to the phase of the clock signal at the common sample instant. A normalized clock period of the data signal may be reconstructed by plotting the communication signal data samples against their corresponding phase values. Using this measurement technique, communication signals that are referenced to the clock signal may be measured with very little horizontal uncertainty.

The dividers of the PatternSync Module 38 are set so that the pattern trigger rate is equal to or less than the oscilloscopes sample rate. Preferably the pattern trigger rate is set to be as close to the maximum sampling rate as possible. The timebase 28 is set-up to acquire an initial set of voltage samples of the communication signal having the spread spectrum clock signal for identifying the slope and a midpoint of an edge of the communication signal. The controller 16 provides varying coarse and fine time delay values to the respective counter and interpolator circuitry in the timebase for varying the strobe to acquire voltage samples of the communication signal over a selected time period. With the slope and the midpoint of the edge for the communication signal known, the timebase is set-up to acquire samples at a nominal time location on the edge of the communication signal. Preferably the nominal time location for the sampling is set as close to the trigger as possible and at the midpoint on the edge. For the DSA8200 Digital Sampling Oscilloscope, the various internal signal delays results in an approximate 17 nsec delay from the trigger signal to the application of the strobe to the Sampling Module 34 and the Phase reference module 40. The counter and interpolator circuits in the timebase are set-up to provide a hold-off time so that the nominal time location is on the first full edge of the communication signal edge after the internal time delay of the oscilloscope. Generally, the nominal time location is close to 20 nsec and is called ntl1.

A set of voltage samples of the communication signal having the spread spectrum clock signal are acquired at the nominal time location ntl1. As the communication signal is sampled at the nominal time location, the spread spectrum clock signal produces spreading and shrinking of the period of the spread spectrum clock period by the amount of the spread spectrum clock base modulation signal. This causes the voltage levels of the voltage samples to rise and fall at the edge in response to movement of the clock edge. As a result, the voltage samples of the edge of the communication signal at a fixed time location relative to the trigger signal represent a distribution identifying the minimum and maximum extent of the timing deviation of the profile of the triangular modulation profile of the spread spectrum clock base modulation signal. The voltage samples are translated into time samples using the slew rate the spread spectrum clock signal.

An estimate of the base modulation signal modulation magnitude ($SSC_{tot}$) of the spread spectrum clock signal is determined by taking the difference between the maximum and minimum values of the timing deviation of the profile of the triangular modulation profile of the base modulation signal, called w1, and dividing the difference result by the time of the nominal time position. The resulting spread spectrum clock base modulation signal modulation magnitude number can be multiplied by a scalar value, such as 1e6, to produce the spread spectrum clock base modulation signal modulation magnitude ($SSC_{tot}$) in parts per million (PPM).

An alternative method of estimating the modulation magnitude of the spread spectrum clock base modulation signal is to acquire a second set of voltage sample of the communication signal having the spread spectrum clock signal at a different nominal time location relative to the trigger signal called ntl2. For example, the nominal time location is set approximately 30 nsec from the nominal time location, 20 nsec, for the acquisition of the first set of voltage samples. Because the voltage samples are acquired at a longer time relative to the trigger signal (approximately 50 nsec) the distribution of the acquired voltage samples identifying the minimum and maximum extent of the spread spectrum clock base modulation signal is wider. As with the first set of voltage samples, the second set of voltage samples are translated into time samples using the slew rate the second set of voltage samples. The difference between the maximum and minimum values of the timing deviation of the profile of the triangular modulation profile is called w2. An estimate of the base modulation signal magnitude ($SSC_{tot}$) of the spread spectrum clock signal is determined using the following equation:

$$SSC_{tot} = w2 - w1/ntl2 - ntl1$$

with the result being the spread spectrum base modulation signal modulation magnitude number. The spread spectrum base modulation signal magnitude number can be multiplied by a scalar value, such as 1e6, to produce the spread spectrum base modulation signal modulation magnitude in parts per million (PPM). The use of the alternate method is expected to provide greater accuracy of the spread spectrum base modulation signal modulation magnitude at the cost of requiring more time to acquire and process the second set of voltage samples.

Figure 2:
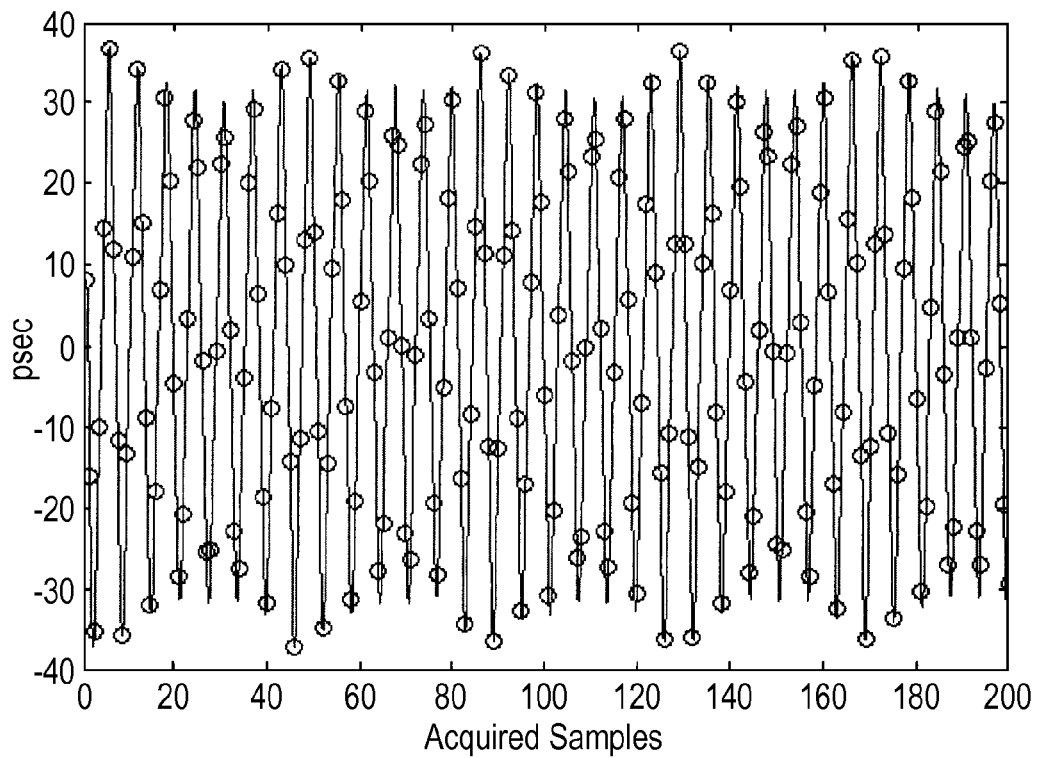
FIG. 2 illustrates repositioned time samples of converted voltage samples in the method of characterizing parameters of a spread spectrum clock base modulation signal in a communication signal and removing spectral components of a spread spectrum clock base modulation signal in a communication signal.
Figure 3:
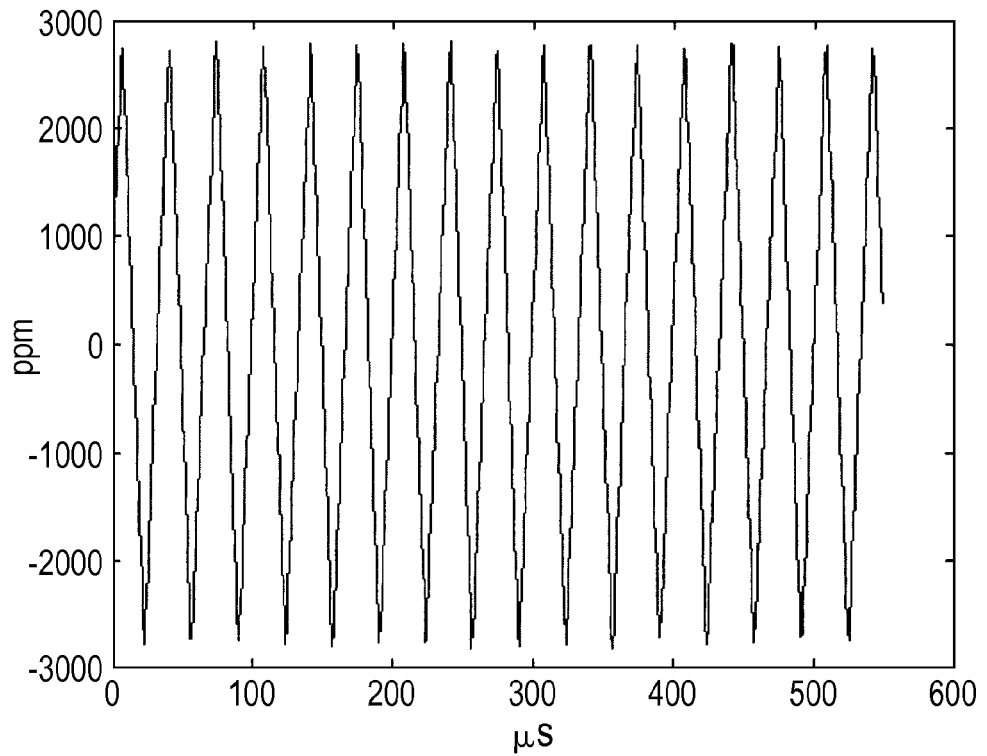
FIG. 3 illustrates an aliased version of the spread spectrum clock modulation profile in the method of characterizing parameters of a spread spectrum clock base modulation signal in a communication signal and removing spectral components of a spread spectrum clock base modulation signal in a communication signal.

The time samples of the triangular modulation profile of the spread spectrum clock base modulation signal may have, for example, six samples for each cycle of the triangular modulation rate, which is 30 KHz to 33 KHz depending on the communication standard. By interpolating between the samples, a modulation profile may be generated. However, such a modulation profile has limited resolution. In the present invention, the time samples are repositioned using an aliased index as shown in FIG. 2 where the background waveform represents the unknown modulation profile. The aliased index is calculated for the time samples by dividing the pattern trigger rate by clock rate of the base modulation signal. The resulting number is rounded to the nearest integer number and used to index between samples. That is, the index value is added to the current time sample location to locate the next time sample location closest to the current time sample plus the index value. The index value is added each of the succeeding relocated time samples. One way of looking at this process is as an equivalent time sampling of the time sample locations. As can be seen from the rearranged time locations in FIG. 2, the indexed time locations form an approximate triangular wave shape that represents the modulation profile but with substantially more data points. This process is performed on the complete set of acquired samples. For the oscilloscope, the complete set of acquired samples is 4000. The over sampled triangular waveform starting at the first time location is used to produce a modulation profile of the base modulation signal as illustrated in FIG. 3.

Figure 4:
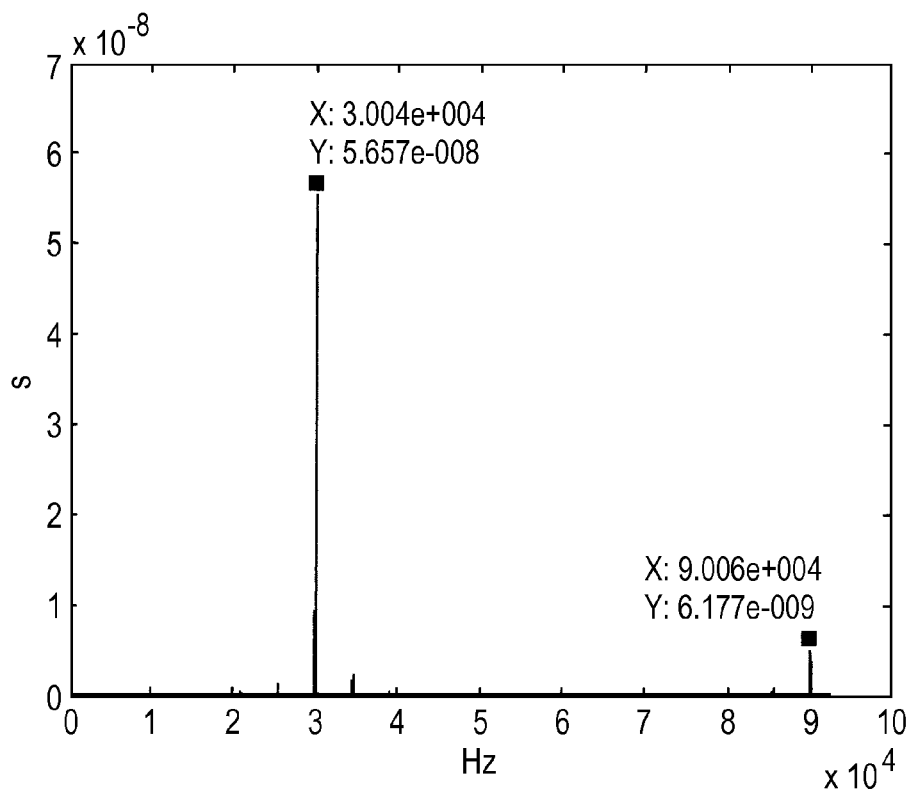
FIG. 4 illustrates the frequency domain components of the spread spectrum clock modulation in the method of characterizing parameters of a spread spectrum clock base modulation signal in a communication signal and removing spectral components of a spread spectrum clock base modulation signal in a communication signal.

The communication signal includes both uncorrelated periodic and random jitter. The spread spectrum clock base modulation signal generates uncorrelated periodic jitter that can be characterized from the acquired set of voltage samples at the nominal time location on the spread spectrum clock signal edge. The set of voltage samples are transformed from the time domain to the frequency domain using one of a number of well known frequency transforming techniques, such as FFTs, windowing and the like. The resulting frequency domain spectrum of the spread spectrum clock base modulation signal includes a base frequency component of the base modulation signal and its harmonics as representatively shown in FIG. 4. The frequency domain representation has a Nyquist cutoff of approximately 100 KHz, which is half the 200 KHz sampling frequency. In addition, the FFT represents 2000 of the maximum 4000 acquisition samples of the spread spectrum clock signal at the nominal time location on the spread spectrum clock signal edge. Knowing the sampling rate and the frequency bin number for the frequency component of the base modulation signal, the base frequency can accurately be determined. For example, in FIG. 4 the base frequency of the base modulation signal is 30.04 KHz. Knowing the base frequency (X), the position of the harmonics of the base modulation signal within the Nyquist frequency cutoff can be identified using the equation: $(2n-1)X - \text{floor}(m \times NY) = z$, where n is an integer value, NY is the Nyquist frequency cutoff, m is an integer value calculated from the base modulation signal and its harmonics being divided by the Nyquist frequency cutoff, and z is the position of the base modulation signal harmonics within the Nyquist frequency cutoff. Since the base frequency of the base modulation signal is approximately 30 KHZ and the Nyquist frequency cutoff is approximately 100 KHz, harmonics of the base modulation signal frequency greater than the Nyquist frequency cutoff will appear as folded back harmonics below the Nyquist frequency cutoff.

For example, the base modulation signal frequency and its third harmonic are derived from the equation term "$(2x-1)X$" where the base modulation frequency "X" is 30.04 KHz and its third harmonic is 90.08 KHz respectively. The equation term "floor(m×NY)" for the 30.04 KHz and the 90.08 KHz frequencies are 0.3 and 0.9 with the term "floor" indicating that the numerical value of the equation term "(m×NY)" is to be rounded downward. In the case of the base modulation frequency of 30.04 KHz and its third harmonic of 90.08 KHz, the rounded down integer values are zero. Therefore, the equation term "floor(m×NY)" equals zero and the base modulation frequency and the third harmonic frequency will within the Nyquist frequency cutoff. The fifth harmonic is calculated as $((2 \times 2)-1) \times 30.04$ KHz (base modulation frequency) which equals 150.12 KHz. The equation term "floor(m×NY)" is calculated as 150.12 KHz divided 100 KHZ which equals 1.5 and is rounded down to one. The Nyquist frequency fold back frequency is the Nyquist frequency cutoff times 1 or 100 KHz. Subtracting the Nyquist frequency fold back frequency, 100 KHz, from the fifth harmonic frequency, 150.12 KHz, results in a frequency value of 50.12 KHz. Therefore, the fifth harmonic of the base modulation frequency will appear at 50.12 KHz within the Nyquist frequency cutoff. The seventh and ninth harmonics of the 30.04 KHz base modulation frequency are 210.16 KHz and 270.20 KHz respectively. The Nyquist fold back frequency for these harmonics are 200 KHZ (210.16 KHz and 270.20 KHz divided by 100 KHz equals 2.1 and 2.7 respectively rounded down to 2 times the Nyquist frequency cutoff, 100 KHZ). Subtracting the Nyquist fold back frequency, 200 KHZ, from the respective seventh and ninth harmonic frequencies (210.16 KHz and 270.20 KHz) results in the respective seventh and ninth harmonic frequencies being at 10.16 KHz and 70.20 KHz within the Nyquist frequency cutoff.

Figure 5:
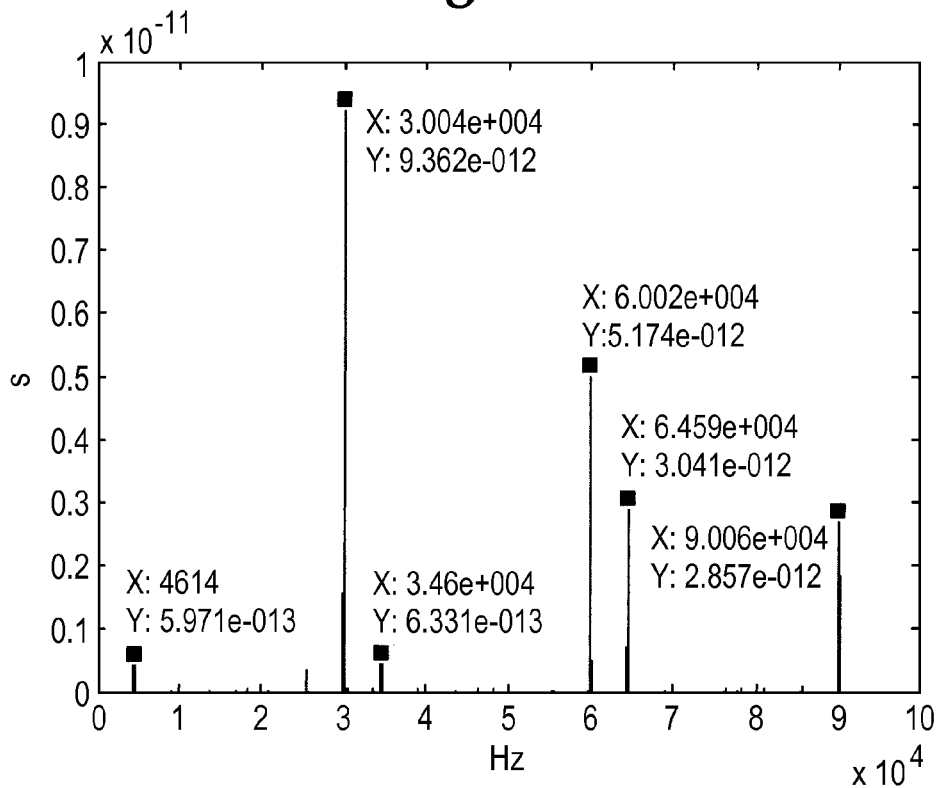
FIG. 5 illustrates the periodic jitter spectrum components and the spread spectrum clock modulation of the communication signal in the method of characterizing parameters of a spread spectrum clock base modulation signal in a communication signal and removing spectral components of a spread spectrum clock base modulation signal in a communication signal.
Figure 6:
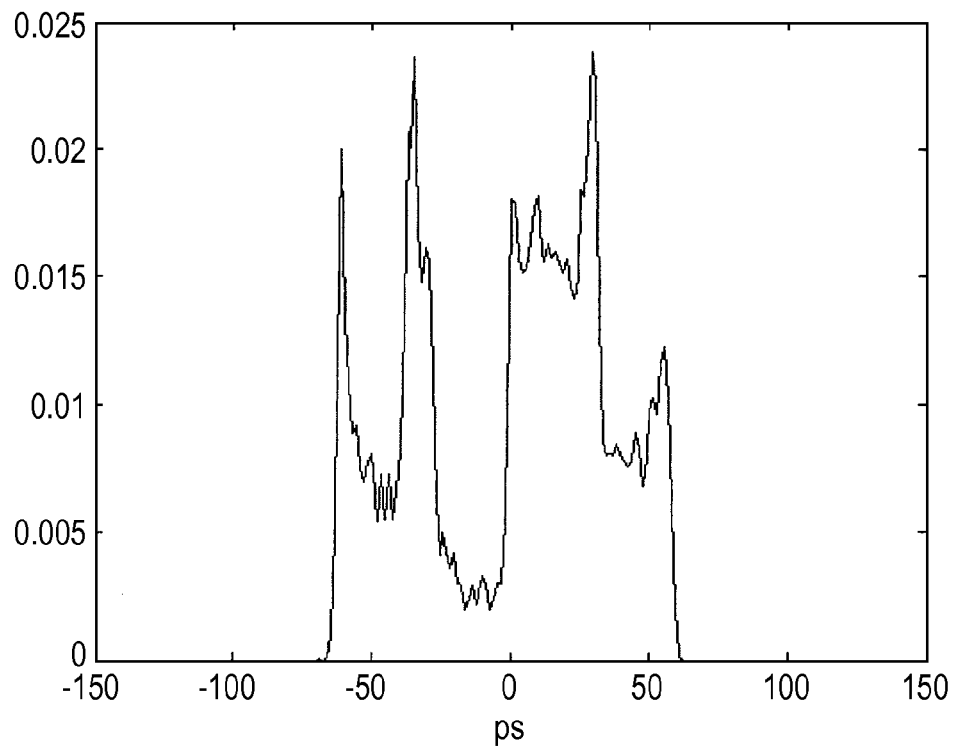
FIG. 6 illustrates the probability distribution function of the periodic jitter in the communication signal including the spread spectrum modulation periodic jitter in the method of characterizing parameters of a spread spectrum clock base modulation signal in a communication signal and removing spectral components of a spread spectrum clock base modulation signal in a communication signal.
Figure 7:
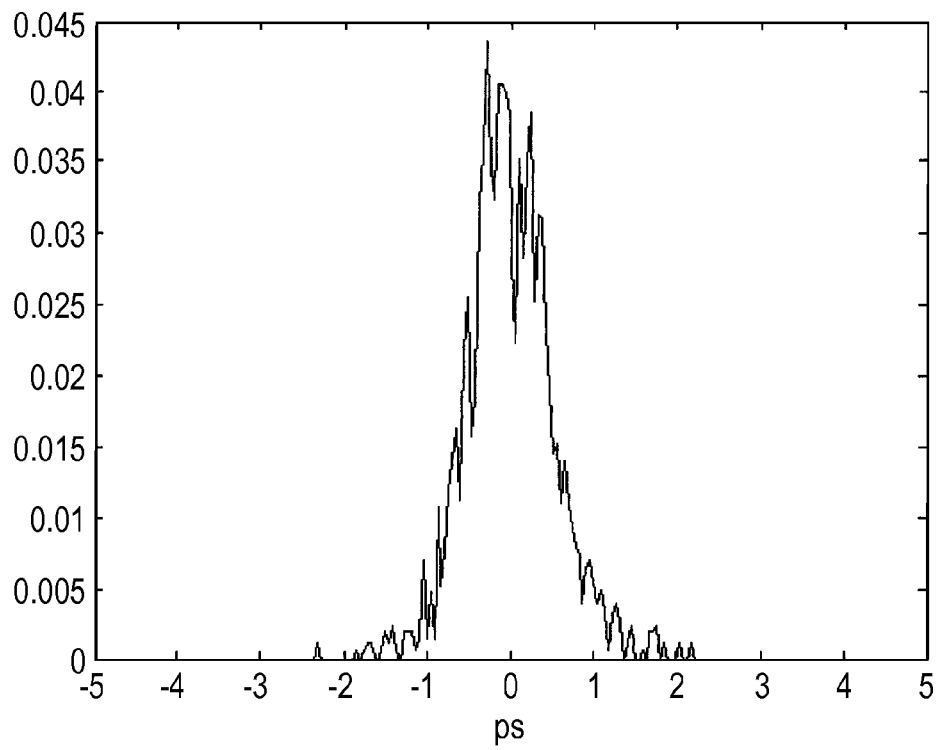
FIG. 7 illustrates the probability distribution function of the periodic jitter in the communication signal with the spread spectrum modulation periodic jitter removed in the method of characterizing parameters of a spread spectrum clock base modulation signal in a communication signal and removing spectral components of a spread spectrum clock base modulation signal in a communication signal.

The timebase of the oscilloscope may be reconfigured to acquire a set of voltage samples of the communication signal over a set time period. The controller 16 provides the sequentially increasing coarse and fine time delay values to the counter and interpolator circuits in the timebase 28 to increase the strobe pulse relative to the trigger. The voltage samples of the communication signal are converted from the time domain to the frequency domain via one of a number of well known frequency transforming techniques, such as FFTs, windowing and the like. Using techniques, such as described in co-pending patent application Ser. No. 11/189,955, filed on Jul. 25, 2005 that is incorporated by reference in its entirety, the frequency components of the uncorrelated periodic and random jitter are identified. FIG. 5 illustrates an example of uncorrelated periodic jitter spectrum in the communication signal that includes the periodic random jitter spectrum of the base modulation signal of the spread spectrum clock and other periodic random jitter. Note that the vertical scale has been increased by three orders of magnitude from FIG. 4. FIG. 6 is a representation of a Probability Distribution Function (PDF) of the periodic jitter in the communication signal that includes the periodic jitter of the base modulation signal of the spread spectrum clock. The distribution of the periodic jitter with the spread spectrum clock periodic jitter has a time distribution greater than 100 psec. FIG. 7 is a representation of the probability distribution function of the periodic jitter where the periodic jitter of the spread spectrum clock has been removed. The time distribution of the periodic jitter has decreased to around 4 psec with the periodic jitter of the spread spectrum clock removed.

Figure 8:
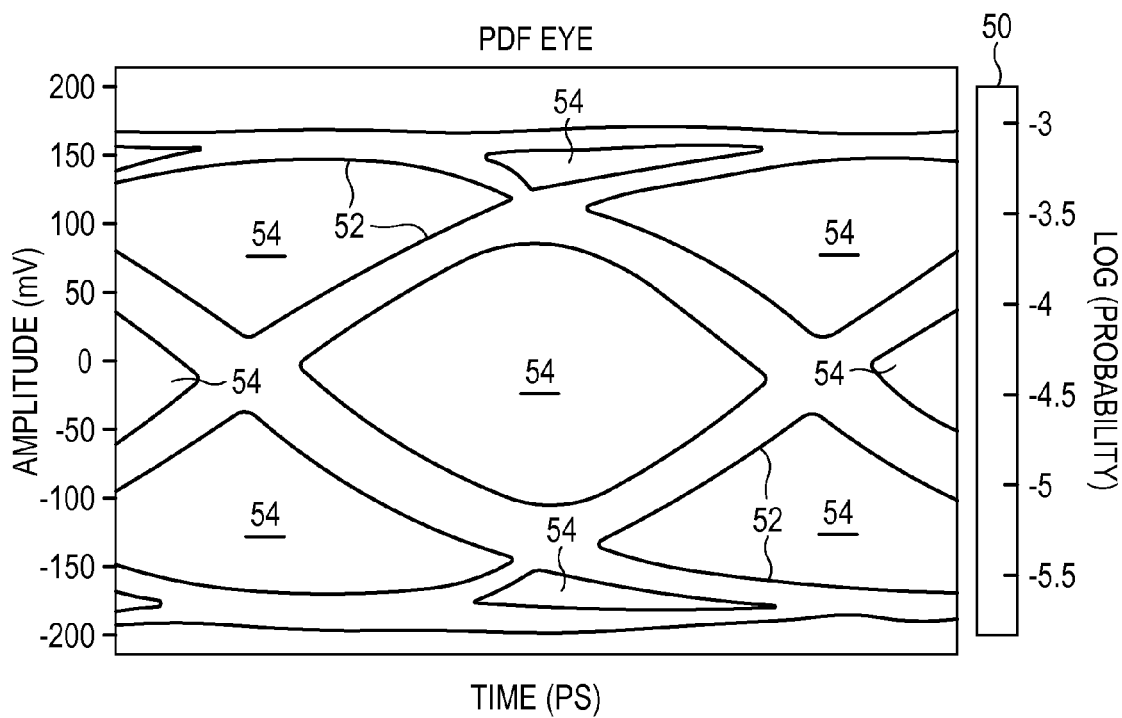
FIG. 8 illustrates a probability density function eye of the communication signal in the method of characterizing parameters of a spread spectrum clock base modulation signal in a communication signal and removing spectral components of a spread spectrum clock base modulation signal in a communication signal.
Figure 9:
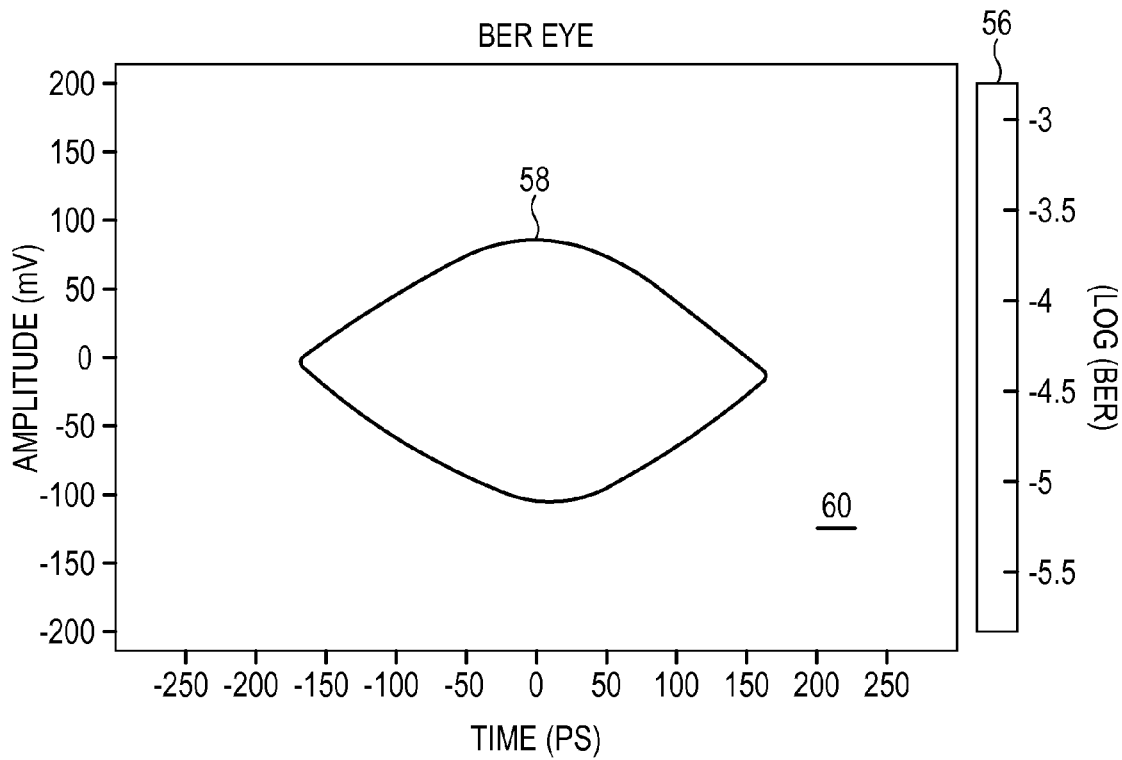
FIG. 9 illustrates a bit error rate (BER) eye of the communication signal in the method of characterizing parameters of a spread spectrum clock base modulation signal in a communication signal and removing spectral components of a spread spectrum clock base modulation signal in a communication signal.

The identified frequency components of the modulation signal of the spread spectrum clock are removed from the frequency domain representation of the communication signal as well as the identified uncorrelated periodic and random jitter identified using the techniques in co-pending patent application Ser. No. 11/189,955, filed on Jul. 25, 2005. The frequency domain representation of the communication signal with the period and random jitter removed is transformed back into the time domain using well known transformation techniques, such as an inverse FFT, inverse DFT and the like. The time domain representation of the communication signal is further processed by processing techniques described in co-pending patent application Ser. No. 11/189,955, filed on Jul. 25, 2005 or other well known techniques to produce a Probability Density Function (PDF) eye display as illustrated in FIG. 8. The PDF eye is displayed in color with the color grading from blue with a low probability to red for a higher probability as represented by the vertical bar 50 of the log of the probability. The communication signal 52 shows-up as red with the edges of the pattern grading to blue in areas 54. FIG. 9 illustrates a bit error rate (BER) eye display. The Bit Error Rate eye is displayed in color with the color grading from blue with a low probability to red for a higher probability as represented by the vertical bar 56 of the log of the probability. The central region 58 will be displayed in blue with the surrounding region 60 displayed in red.

The present invention has been described using particular types of electronic modules and instruments. These particular types of electronic modules and instruments are used by example and other types of electronic modules and instruments performing similar functions can be used without departing from the scope of the below claims. Further, the various values used above are by example only and other value may be used without departing from the scope of the present invention.

The foregoing description of the invention has been described for the purposes of clarity and understanding. It is not intended to limit the invention to the precise form disclosed.

The invention claimed is:

1. A method of estimating a spread spectrum modulation magnitude of a spread spectrum clock base modulation signal in a communications signal comprising the steps of:

a) acquiring a set of voltage samples representative of the communication signal having the spread spectrum clock base modulation signal at a nominal time location;
b) converting the first set of voltage samples into time samples representing triangular modulation rate profiles for each cycle of the spread spectrum clock base modulation signal;
c) determining the difference between the maximum and minimum values of the timing deviation of the triangular modulation rate profile of the spread spectrum clock base modulation signal at the first nominal time location;
d) acquiring a second set of voltage samples representative of the communication signal having the spread spectrum clock base modulation signal at a second nominal time location greater than the first nominal time location;
e) converting the second set of voltage samples into time samples representing triangular modulation rate profiles for each cycle of the spread spectrum clock base modulation signal;
f) determining the difference between the maximum and minimum values of the timing deviation of the triangular modulation rate profile of the spread spectrum clock base modulation signal at the second nominal time location; and
g) generating a spread spectrum clock magnitude number of the spread spectrum clock base modulation signal by subtracting the difference between the maximum and minimum values of the timing deviation of the triangular modulation rate profile at the first nominal value from the difference between the maximum and minimum values of the timing deviation of the triangular modulation rate profile at the second nominal value and dividing resultant number by the difference between the second and first nominal time locations of the communication signal.

2. The method of estimating a spread spectrum modulation magnitude of a spread spectrum clock base modulation signal as recited in claim 1 further comprising the step of multiplying the spread spectrum clock base modulation signal magnitude number by a scalar to produce a spread spectrum clock modulation magnitude.

3. A method of estimating a spread spectrum modulation profile of a spread spectrum clock base modulation signal in a communication signal comprising the steps of:
a) acquiring a set of voltage samples representative of the communication signal having the spread spectrum clock base modulation signal at a nominal time location;
b) converting the set of voltage samples into time samples representing triangular modulation rate profiles for each cycle of the spread spectrum clock base modulation signal;
c) calculating an integer aliased index value as a function of a pattern trigger rate divided by the clock rate of the spread spectrum clock signal;
d) adding the integer aliased index value to an initial time sample location to reposition a subsequent time sample location;
e) adding the integer aliased index value to the repositioned time sample location to reposition another subsequent time sample location; and
f) repeating step (e) for the subsequent time sample location for the complete set of time samples to generate over sampled triangular waveforms representing the spread spectrum clock base modulation signal modulation profile; and
g) generating a spread spectrum clock base modulation signal modulation profile from the over sampled triangular waveform starting at the initial time sample location.

* * * * *